UNITED STATES PATENT OFFICE.

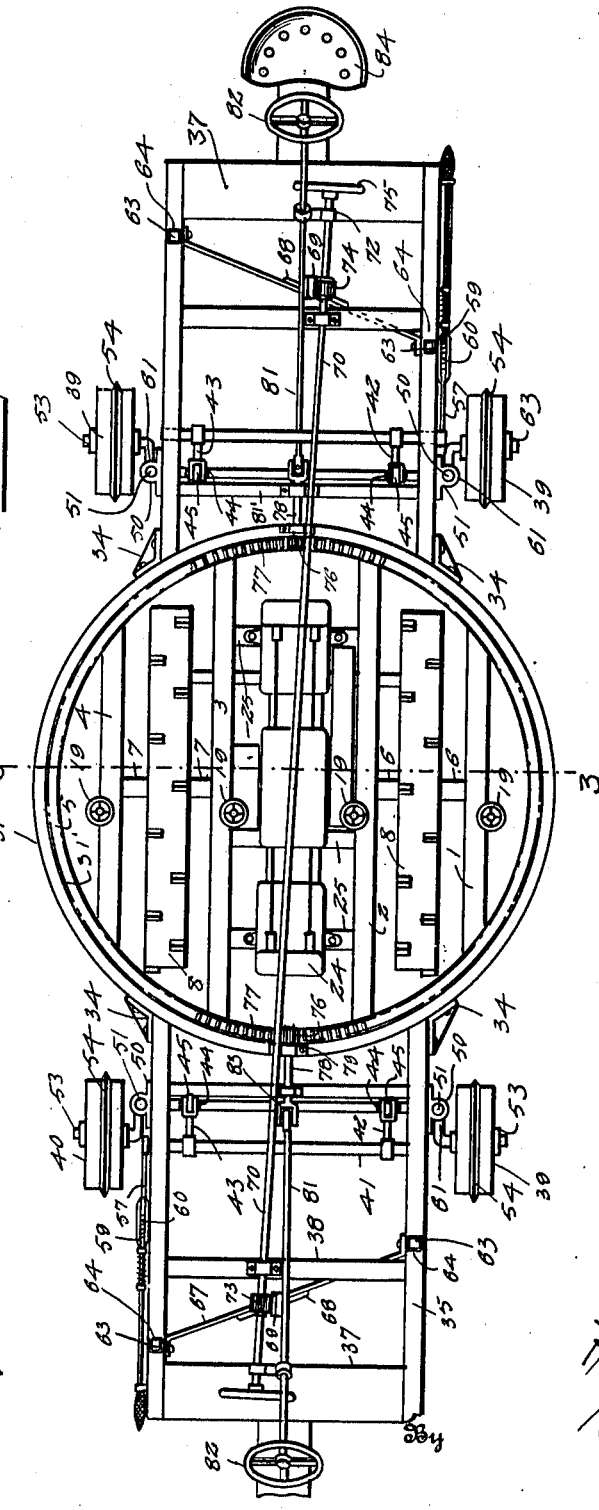

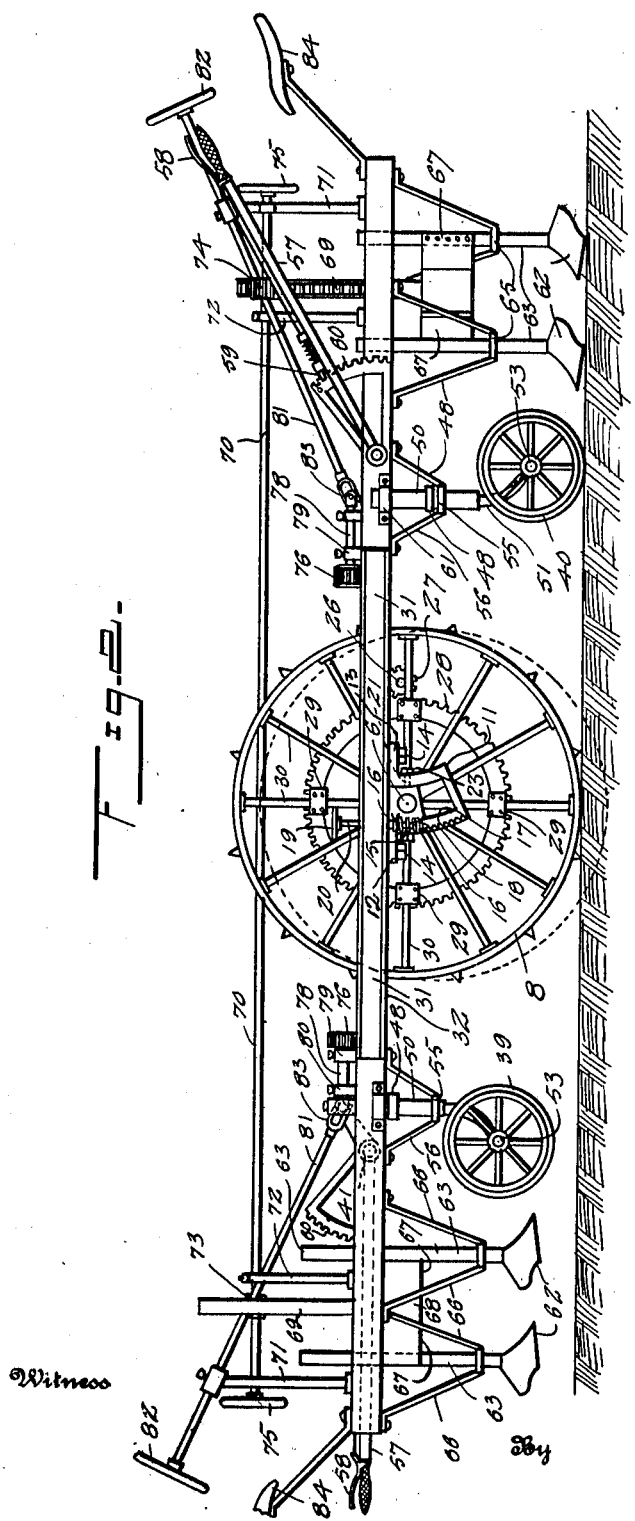

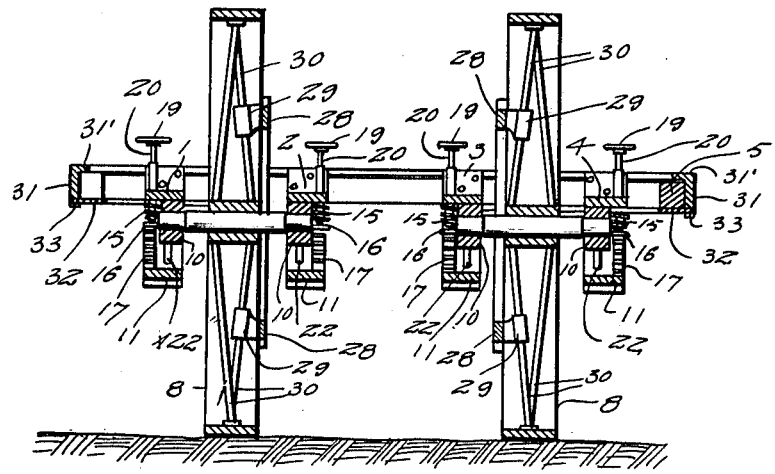

FRANCISCO TESEIRO, OF UNIÓN DE REYES, CUBA.

TRACTOR.

1,311,726. Specification of Letters Patent. Patented July 29, 1919.

Application filed December 8, 1917. Serial No. 206,217.

*To all whom it may concern:*

Be it known that I, FRANCISCO TESEIRO, a citizen of the Republic of Cuba, and a resident of Unión de Reyes, Province of Matanzas, Republic of Cuba, have invented certain new and useful Improvements in Tractors, of which the following is a full, clear, and exact specification.

This invention relates to tractors employed for performing the various cultivating operations.

The object of this invention is to provide certain named improvements in the construction of tractors in order to adapt them to perform their operation more efficiently.

In the annexed drawings:—

Figure 1 is a top plan view of a tractor provided with the improvements constituting this invention.

Fig. 2 is a side elevation of the said tractor.

Fig. 3 is a vertical cross-section on line 3—3 of Fig. 1.

Fig. 4 is a perspective view partly in section showing the mounting of the supplementary wheels.

This tractor comprises an inner frame formed by a plurality of metallic beams 1, 2, 3, 4 secured to a horizontal ring 5, the shafts 6 and 7 of the driving wheels 8 of the vehicle being independently mounted on bearings 10 located underneath each one of the beams 1, 2, 3, 4, which bearings are adjustable within curved guide-casings 11. These guide-casings are fixed beneath said beams by means of end flanges 12 and 13 which are secured to the bottom of the beams by bolts 14, the adjustable movement of each bearing 10 within the respective guide-casing 11 being effected by means of a vertical worm gear 15 rotatably mounted on lugs 16 which project laterally from each bearing; and meshing with a rack 17 formed on a lateral rim 18 secured at one side of each guide-casing 11, each worm gear 15 being operated by means of a hand wheel 19 provided at the upper end of a rod 20 forming an extension of the axle of each worm gear 15. Said bearings 10 are prevented from having a lateral movement within the guide-casings 11 by means of set screws 21 projecting from the bearings through slots 22 in guide-casings 11, and nuts 23 screwed on the threaded ends of said screws.

Motion is given to the driving wheels 8 from a motor 24 securely mounted on cross-bars 25 secured to the intermediate beams 2 and 3, by means of a cross-shaft 26 mounted on the same bars and provided at its ends with gear pinions 27 meshing with gear crowns 28 secured to the inner side of driving wheels 8 by means of clamps 29 projecting from each crown 28 and which are secured by means of bolts around spokes 30 of driving wheels 8.

The frame described is movable in an outer frame by a horizontal ring of angular cross section 31 which surrounds the ring 5 of the inner frame and bears on same by its upper flange 31', said ring 31 being provided with an annular horizontal plate 32 secured by means of screw 33 to the vertical portion of said ring 31 (Fig. 4). Sills 35 connected together by end plates 37 and intermediate cross-bars 38 are fixed to said ring by means of angular plates 34. Each one of these structures carries a couple of supplementary wheels 39 and 40 which may be raised or lowered as may be desired. The sills 35 are provided with a horizontal shaft 41 which has secured thereto at its intermediate portion arms 42 and 43 having a fork at their end to support a pin 44 to which is pivotally secured an arm 45. A horizontal bar 46 passes through openings in said arms 45 and is prevented from longitudinal movement by pins 47, said bar 46 having each end terminating in a collar 48 through which passes a set screw 49. These collars embrace a vertical sleeve 50 through the interior of which passes a vertical bar 51 prevented from moving downward by means of a pin 52. The bars are outwardly curved at their lower ends to form horizontal shafts 53. Mounted on these horizontal shafts 53 are the ground bearing wheels 39 and 40 which present on their periphery a metallic tire of sharp edge 54 to enter into the ground and to serve as a guide to the wheel in the traveling direction of the vehicle. The vertical sleeves 50 are loosely mounted by means of peripheral recesses thereon within the collars 55 formed at the vertex of V-shaped brackets 56 which are secured by means of screws to the bottom of sills 35. On one of the ends of horizontal shaft 41 is secured a lever arm 57 to which is pivoted a small crank lever 58 to operate a pawl 59 acted upon by a spring and engaging a ratchet 60 secured to the outer side of sills 35. By this means the wheels 39 and 40 are adjusted, To the sills 35 are secured brackets 61 surrounding the sleeve 50 above the collar 48.

On each one of sills 35 there is mounted an agricultural implement adapted to perform the cultivating operation which is desired, such as for instance a plow grate and mold board 62 which is secured to the lower end of a vertical bar 63 passing through openings 64 formed in the upper and lower portion of each sill 35, and also passing through a collar 65 formed at the vertex of a U-shaped bracket 66 secured to each sill. One of the plowing pieces 62 is disposed in front of the other and the bars 63 of both are connected by a vertical plate 67 diagonally arranged and to whose central portion there is fixed a vertical plate 68 upwardly extended to form a vertical rack 69. The two racks 69 have their teeth extending toward opposite sides of the machine in order that they may be moved in opposite directions simultaneously by a horizontal shaft 70 which extends from the rear to the front of the tractor and mounted thereon by means of two upright posts 71 and 72, which are secured on the connecting end plates 37. The shaft 70 is slightly inclined with respect to the longitudinal axle of the tractor, so that it may be located in front of the opposite geared faces of racks 69 in order that they may mesh with two beveled pinions 73 and 74 fixed to said shaft 70. The shaft 70 carries on each end a hand wheel 75, in order to raise or lower the forward or rear plows of the tractor as the case may be.

In order to rotate the inner frame on the outer frame or vice versa, there is provided on each end structure a hand actuated mechanism which consists of a couple of gear pinions 76 arranged at opposite ends of the inner ring 5 and said pinions 76 mesh with a geared crown 77 shown on the upper face of said ring. The pinions are fixed at the ends of short horizontal shafts 78 mounted on bearings 79, 80, one of which is fixed on the outer ring 31 and the other one on a cross-bar 81' fixed between the sills 35 of each end structure connected to the outer ring 31. The shaft 78 is actuated by means of an oblique shaft 81 supported on a bracket projecting from the upright post 71 which is provided at its upper end with a hand wheel 82, each oblique shaft 81 being connected with each horizontal shaft 78 by means of a universal joint 83. On the end portion of each structure there is fixed a seat 84 for the operator.

The operation of the improved tractor is as follows: The tractor is made to travel on a straight line in such a manner that one of the driving wheels 8 may pass on the furrow previously made, to which end, since the wheel advancing in this manner will be lower than the other, the other treading wheel should be lowered with respect to the frame. This is accomplished by means of the handles 19, which are actuated to turn the worm gears 15 mounted on bearings 10 meshing with racks 17 of the guide-casing 11. This causes said bearings to descend through the guide-casings 11 carrying with them their respective driving wheel. Supposing that the tractor is advancing to the left of the drawing on Fig. 1, in which movement the plows that work are the ones disposed behind the driving wheels. Therefore those plows and the supplemental wheels 39 and 40 must be in lowered position, and raised position, respectively. When the tractor reaches the end of the course in straight line it must be moved backward diverting slightly to follow a course parallel to the previous one, and to do this, the first thing that the operator must do from his rear seat 84, is to raise the rear wheels 39 and 40 to which end he will move downward the lever arm 57 and press the small crank lever 58 so that pawl 59 may go over the geared segment 60. The operator now comes down from seat 84 and occupies the other similar seat at the opposite end of the tractor, and he will lower the wheels 39 and 40 of this end until they bear on the ground, whereupon he will slightly actuate the hand wheel 75 of the adjacent end of shaft 70 thus slightly lowering the agricultural implements 62 of the same end, whereby the agricultural implements 62 of the opposite end, that were previously working the ground are correspondingly raised. Now in order to divert the direction of the machine, the oblique shaft 81 of the same end is rotated by means of hand wheel 82, thus rotating the adjacent geared pinion 76, which on meshing with geared crown 77 rotates the inner ring 5 within the outer ring 31 and therewith all the inner frame formed by the beams 1, 2, 3, 4 and with these the treading wheels 8. If the motor is now operated and the tractor moved rearwardly, the machine will divert until reaching the new furrow line parallel to the first one and once on the new line, the inner ring 5 is rotated for the same angular distance in an opposite direction so that the tractor may rest in a direction parallel to the previous one. The rearward movement is now continued, the agricultural implements that are now in front of the tractor being completely lowered in order that same be the ones at work now, and in this manner the operation is continued until the tractor reaches the end of the line or the boundary of the land, whereupon the operation is repeated.

It is obvious that the form of the frames of the engine, and even that of the operating mechanisms of the supplemental wheels and agricultural implements used can be varied without altering the spirit of the invention, which is as pointed out in the following claims.

What I claim is:

1. A tractor including an inner and an outer frame connected together, horizontal bars rotatably mounted in said outer frame, arms secured to said shaft, wheels, horizontal bars connecting said wheels, links interposed between the horizontal bars and arms, and means for rotating the shafts.

2. In a tractor, a main frame having a ring, an inner frame having a ring mounted and arranged to turn in the ring of the main frame, two pairs of vertically arranged segmental guide casings secured to and depending from the inner frame and each provided with a rack; bearings mounted for vertical arcuate movement in said guide casings, shafts each mounted in one of said bearings and having a worm engaging one of said racks, and a pair of tractor wheels each having a shaft mounted in two of said bearings, so that either of said tractor wheels may be raised or lowered independently of the other.

3. In a tractor, a frame, a transverse shaft mounted in the sides of said frame and provided with arms, a lever to turn said shaft, means to lock said lever, vertical sleeves secured to said frame for vertical movement, trail wheels having axles provided with vertical portions mounted in said sleeves, a horizontal bar connecting said sleeves, and links connecting said bar to the arms of the said shaft.

In witness whereof I affix my signature.

FRANCISCO TESEIRO.

Copies of this patent may be obtained for five cents each, by addressing the "Commissioner of Patents, Washington, D. C."